United States Patent Office 3,753,858
Patented Aug. 21, 1973

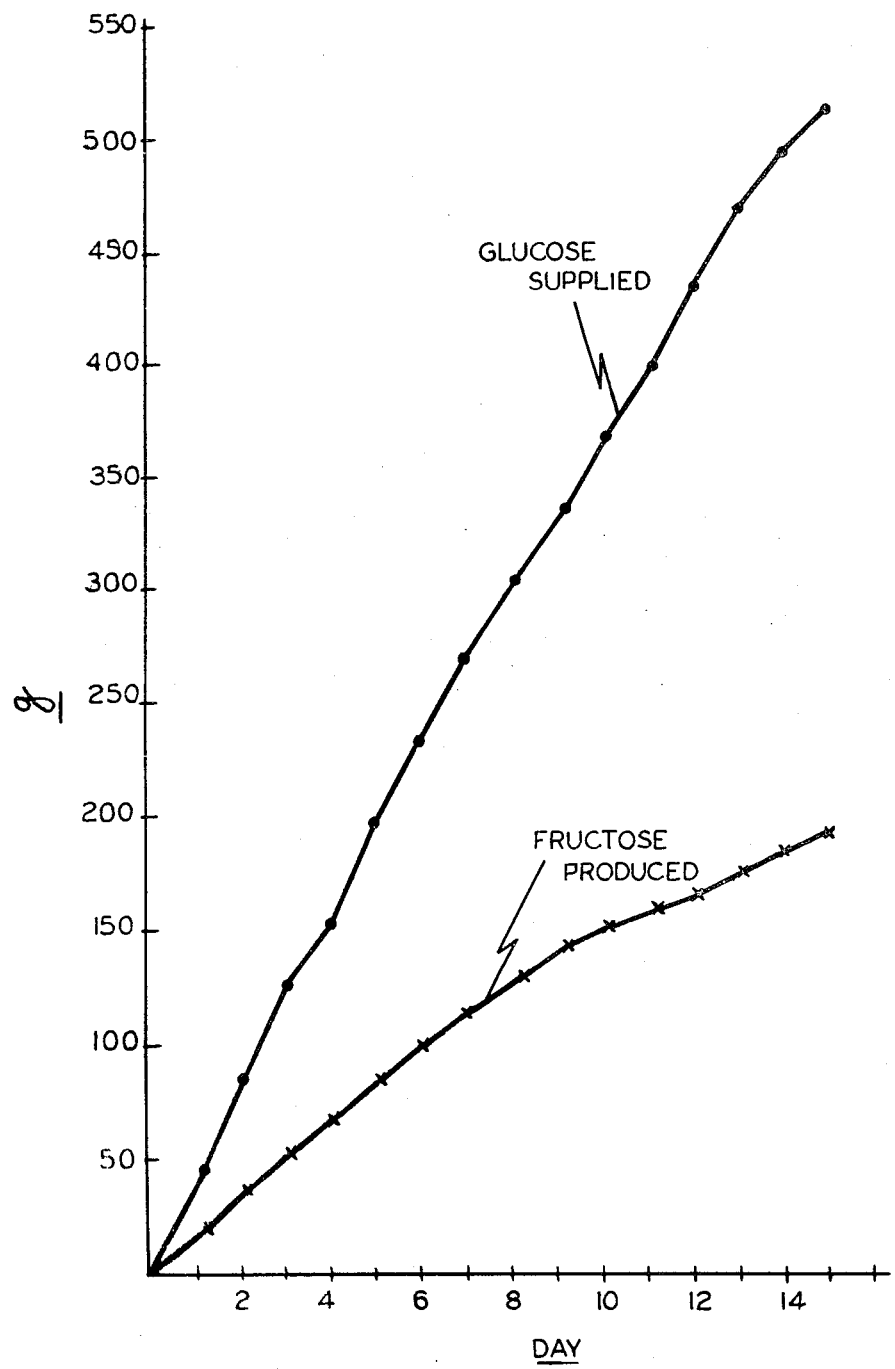

3,753,858
METHOD OF CONVERTING GLUCOSE INTO FRUCTOSE
Yoshiyuki Takasaki, and Akira Kamibayashi, Chiba-shi, Japan, assignors to Agency of Industrial Science & Technology, Tokyo, Japan
Filed Jan. 15, 1969, Ser. No. 791,309
Claims priority, application Japan, Jan. 20, 1968, 43/3,433
Int. Cl. 13k 1/00, 9/00
U.S. Cl. 195—31 F 7 Claims

ABSTRACT OF THE DISCLOSURE

A method for converting glucose into fructose using a microorganism from the Streptomyces genus in which a glucose isomerizing enzyme is fixed in the microorganism by the step of treating the microorganism containing the enzyme at a temperature of about 60° C. to about 85° C.

---

This invention relates to a method of fixing a glucose isomerizing enzyme in the microorganism and a method for converting glucose into fructose by using said microorganism.

The present inventors have found a method of converting glucose into fructose which comprises culturing Streptomyces having an ability to utilize xylan, for example, strains of *Streptomyces albus*, *Streptomyces wedmorensis* or the like in a medium containing a xylan-containing substance such as wheat bran, corn cobs, corn husks, rice straw or the like to produce a glucose isomerizing enzyme (which converts glucose to fructose) in the cells of the microorganism and employing said enzyme in the isomerization of glucose to fructose.

The glucose isomerizing enzyme, an intracellular enzyme is presently used, as it is, as a source of enzyme, but it can be disadvantageously extracted from the cells by autolysis upon treatment at about 15 to 50° C. The autolysis is a phenomenon caused by the action of various enzymes, so, when an enzyme system alone which participates in the autolysis is inactivated by heat-treatment at a temperature in the range in which said enzymes system is inactivated but at which temperature the glucose isomerizing enzyme remains stable, the glucose isomerizing enzyme is not extracted from the cells.

The object of this invention is to provide a method of effectively fixing the glucose isomerizing enzyme in the micrroganism and a method for converting glucose into fructose easily by using said microorganism.

With the above and other objects in view which will become apparent in the following detailed description, the present invention will be clearly understood in connection with the accompanying drawing in which the only figure is a graph showing the amount of glucose passing through a column packed with microorganism in which a glucose isomerizing enzyme has been fixed and the amount of fructose converted from said glucose.

The glucose isomerizing enzyme produced in the cells of a strain of Streptomyces exhibits extremely high heat-stability at an optimum temperature of about 80° C., whereas enzymes which participate in the autolysis are inactivated upon heat-treatment at about 60° C. for about 10 minutes. Thus, it is possible to fix the glucose isomerizing enzyme intracellularly in an insoluble state by treating the glucose isomerizing enzyme-containing cells at a temperature higher than about 60° C. but lower than 85° C. thereby inactiving only the enzymes which participate in the autolysis.

The fixing of the glucose isomerizing enzyme in the cells may preferably be effected by heat-treatment of an aqueous suspension of the cells, but, if the broth of the glucose isomerizing enzyme-producing microorganism is heat-treated immediately after completion of the culturing, the treatment becomes easy, and, moreover, it becomes possible to recover the enzyme in high yield, since the dissolving-out of the enzyme caused by autolysis during the filtration step of the broth can be avoided. Further, the enzyme preserves better, the inactivation is less and the yield becomes high in the case where the broth is heat-treated after culturing and the cells are thereafter dried than in the case where the cells are dried without heat-treatment. For example, when drying is carried out without having heat-treated the broth about 65% of the original activity can be recovered, whereas when cells are dried after the broth has been heated at 70° C. for 10 minutes, about 85% of the original activity can be recovered. Further, it is preferable to carry out the filtration of the broth after heat-treatment, whereby the viscosity of the broth is reduced to make the filtration easy. For example, the filtration of 4 m.$^3$ of the broth to which about 4% by weight of diatomaceous earth has been added requires about 3 hours under a pressure of about 3 kg./cm.$^2$, whereas the filtration of the same broth after heating at 70° C. can be completed within only about one hour under the same conditions as above.

Futhermore, when the above heat-treatment is conducted after the addition of a cobalt salt such as $CoCl_2$ in an amount of 0.001 to 0.01 M to the broth to be heat-treated, the heat-stability of the glucose isomerizing enzyme can be increased thereby minimizing the loss of the enzyme to be caused by heat-inactivation.

The cells in which the glucose isomerizing enzyme has been fixed by the above method are added to a glucose-containing solution to convert the glucose into fructose, and may thereafter be recovered from the reaction solution by filtration or centrifugal separation for reuse. Also, the cells may be used in the continuous isomerization of glucose to fructose by passing a glucose-containing solution through a column packed with the cells.

The activity of the glucose isomerizing enzyme in this invention was determined by the following manner:

To a small portion of the supernatant obtained by centrifugal separation of the treated cells at a rate of 7,000 r.p.m. for about 5 minutes were added 0.5 ml. of a 0.2 M phosphate buffer solution (pH 7.2), 0.2 ml. of a 0.1 M $MgSO_4$ solution and 0.2 ml. of a 1 M glucose solution, and the total volume of the mixture was adjusted to 2.0 ml. with water. The mixture was then reacted for 1 hours, after which 2.0 ml. of a 0.5 M perchloric acid was added thereto to discontinue the reaction. The fructose thus produced in the reaction mixture was quantitatively determined by the cysteine-carbazole method, and the amount of the enzyme which produced 1 mg. of fructose under such conditions was referred to as 1 unit.

The method of this invention is further illustrated by the following examples, but these examples are not construed to limit the scope of this invention.

EXAMPLE 1

100 ml. of the medium comprising 3% wheat bran, 2% corn steep liquor and 0.024% $CoCl_2$ and having pH 7.0 were charged into a 500-ml. Sakaguchi flask and, after being sterilized by a standard technique inoculated with *Streptomyces alubs* ATCC 21132. The microorganism was then cultured at 30° C. for 24 hours with shaking.

After completion of the culturing, the broth was centrifuged to collect the cells, which were then washed with water and suspended in water (25.4 mg./ml. on the dry basis).

Using the above cell suspension (20 ml.), the amount of the glucose isomerizing enzyme extracted from the cells was determined with respect to the suspension heat-treated at 60° C. for 10 minutes and the untreated suspension by adding ethyl acetate in an amount of 1% to each of the suspensions and incubating the suspensions under the optimum conditions for autolysis, i.e., at a temperature of 40° C. and at pH 6.5 to 7.0, for 6, 12 and 24 hours, respectively. The results obtained were as shown in Table 1 below. The total amount of the glucose isomerizing enzyme is referred to as the amount of the enzyme extracted after disrupting the cell suspension by a sonic oscillator for 10 minutes with a wave length of 10 kilocycles.

As is clear from Table 1, in the case where the cell suspension was subjected to the heat-treatment, only about 16% of the glucose isomerizing enzyme was extracted after 24 hours' incubation as compared with the control (no heat-treatment) wherein the glucose isomerizing enzyme was extracted increasingly as the time elapsed.

Table 2 indicates the amount of glucose isomerizing enzyme extracted from the cells when 0.1% of cetyl pyridinium chloride which possesses the action to promote the extraction of the glucose-isomerizing enzyme by autolysis was added to the above described heat-treated cell suspension and the untreated cell suspension, respectively, and the resulting cell suspensions were incubated for 6, 12 and 24 hours, respectively, at 40° C. in the same manner as above. The results in Table 2 indicate that, in the case where the cell suspension was subjected to the heat-treatment, only about 17% of the enzyme was extracted as compared with the control (no heat-treatment) in which the enzyme was completely extracted after 24 hours' incubation.

extracted glucose isomerizing enzyme is lower than that in the case of the untreated cells, indicating that the glucose isomerizing enzyme itself appears to be inactivated. Accordingly, it is preferable to carry out the heat-treatment for fixing the glucose isomerizing enzyme in the cells at a temperature in the range of about 60 to 85° C.

TABLE 3

| Treatment temp. (°C.) | Treatment time (min.) | Extracted G.I. (A) (unit/ml.) | Total G.I. (B) (unit/ml.) | Extraction ratio (A)/(B)×100 (percent) |
|---|---|---|---|---|
| 50 | 10 | | | |
|    | 20 | | | |
|    | 30 | 14.6 | 14.4 | 101 |
|    | 60 | 14.8 | 14.4 | 103 |
|    | 120 | 14.1 | 14.1 | 100 |
|    | 240 | 15.6 | 14.4 | 108 |
| 55 | 30 | 15.1 | 14.6 | 103 |
|    | 120 | 14.6 | 15.8 | 92 |
| 60 | 10 | 3.6 | 15.0 | 24 |
|    | 22 | 3.2 | 15.0 | 21 |
| 70 | 10 | 2.4 | 14.6 | 16 |
| 75 | 10 | 1.5 | 13.4 | 11 |
| 80 | 10 | 1.3 | 12.0 | 11 |
| 85 | 2 | 1.2 | 13.9 | 9 |
|    | 5 | 3.3 | 8.8 | |
|    | 10 | 0.9 | 8.0 | |
| 90 | 1 | 1.2 | 4.3 | |
|    | 3 | 0.8 | 2.0 | |
| 95 | 1 | 0.9 | 1.0 | |
| 100 | 1 | 1.3 | 1.2 | |
| Untreated control | | 15.6 | 15.0 | 104 |

NOTE.—G.I.=Glucose isomerizing enzyme.

TABLE 1

| | Control | | | Heat-treated cell | | |
|---|---|---|---|---|---|---|
| Extraction time (hour) | Extracted G.I. (A) (unit/ml.) | Total G.I. (B) (unit/ml.) | Extraction ratio (A)/(B)×100 (percent) | Extracted G.I. (A) (unit/ml.) | Total G.I. (B) (unit/ml.) | Extraction ratio (A)/(B)×100 (percent) |
| 6 | 1.0 | | | 1.3 | | |
| 12 | 2.9 | | | 1.0 | | |
| 24 | 9.5 | 11.3 | 84 | 2.1 | 13.0 | 16 |

TABLE 2

| | Control | | | Heat-treated cell | | |
|---|---|---|---|---|---|---|
| Extraction time (hour) | Extracted G.I. (A) (unit/ml.) | Total G.I. (B) (unit/ml.) | Extraction ratio (A)/(B)×100 (percent) | Extracted G.I. (A) (unit/ml.) | Total G.I. (B) (unit/ml.) | Extraction ratio (A)/(B)×100 (percent) |
| 6 | 2.1 | | | 1.0 | | |
| 12 | 6.8 | | | 2.5 | | |
| 24 | 15.6 | 15.2 | 103 | 2.4 | 14.0 | 17 |

NOTE.—G.I.=Glucose isomerizing enzyme.

EXAMPLE 2

The aqueous suspension of the cells obtained in the same manner as Example 1 was heat-treated at a temperature in the range of 50° C. to 100° C. Ethyl acetate was then added in an amount of 1% to the suspension, and the resulting suspension was incubated for 24 hours under the optimum conditions for extraction of the glucose isomerizing enzyme by autolysis, i.e., at pH 6.5 to 7.0 and at a temperature of 40° C., followed by determining the amount of the extracted enzyme. The total amount of the glucose isomerizing enzyme was also determined after treatment of the cell suspension by means of an ultrasonic oscillator for 10 minutes with a wave length of 10 kilocycles. The results obtained were as shown in Table 3.

As is clear from Table 3, in the case where the cell suspension is subjected to the heat-treatment at a temperature in the range of 60 to 85° C., 80 to 90% of the total amount of the glucose isomerizing enzyme can be fixed intracellularly, but the enzyme cannot be fixed by the treatment at 55° C. for 2 hours as well as at 50° C. for 4 hours. On the other hand, in the case of the cells treated at a temperature above 90° C., even when subjected to the ultrasonic treatment, the amount of the

EXAMPLE 3

Streptomyces albus ATCC 21132 was inoculated in a medium having the same composition as in Example 1 and cultured at 30° C. for 48 hours with shaking. After completion of the culturing, three portions of the broth (each 80 ml.) were heated slowly to a temperature of 70° C., 75° C. and 78° C., respectively, and then cooled slowly. 20 mg. of lauryl pyridinium chloride which possesses the action to promote the extraction of the glucose isomerizing enzyme by autolysis was added to each of the above heat-treated broths and to a control which was not heat-treated, and the resulting broths were incubated at pH 6.5 to 7.0 and at a temperature of 40° C. for 25 hours. The results obtained were as shown in Table 4 below. As is clear from Table 4, the glucose isomerizing enzyme can completely be fixed in the cells by heat-treatment.

It was found that, in the broth of Streptomyces albus used in the above experiments, about 40% of the total glucose isomerizing enzyme had been extracted out of the cells by autolysis. Accordingly, the extraction ratio is calculated by deducting the amount of glucose isomerizing enzyme (A) extracted prior to the heat-treatment from the amount of glucose isomerizing enzyme (B) extracted after the heat-treatment.

TABLE 4

|  | Treatment temperature (° C.) | | | Untreated control |
|---|---|---|---|---|
|  | 70 | 75 | 78 |  |
| Time required for heating from 30° C. to treatment temperature (minute) | 9.5 | 13.0 | 19.0 | -------- |
| Time required for cooling from treatment temperature to 30° C. (minute) | 40.0 | 42.0 | 44.0 | -------- |
| G.I. extracted prior to treatment (A) (unit/ml.) | 8.0 | 8.0 | 7.5 | 7.8 |
| G.I. extracted after 24 hours treatment (B) (unit/ml.) | 8.0 | 8.0 | 7.5 | 18.0 |
| Total G.I. (C) (unit/ml.) | 18.0 | 18.3 | 18.7 | 17.5 |
| Extraction ration (B) (A)/(C) × 100 (percent) | 0 | 0 | 0 | 103 |

NOTE.—G.I. = Glucose isomerizing enzyme.

EXAMPLE 4

Each of *Streptomyces wedmorensis* ATCC 21230, *Streptomyces pseudogriseolus* ATCC 12770, *Streptomyces achromogenus* ATCC 12767, *Streptomyces bobiliae* NIHJ No. 145, *Streptomyces galbus* NIHJ No. 363 and *Streptomyces canus* was inoculated in 100 ml. of a medium comprising 1% polypepton, 1.0% xylose, 0.3% $K_2HPO_4$, 0.1% $MgSO_4 \cdot 7H_2O$ and 0.024% $CoCl_2$, and cultured at 30° C. for 24 hours with shaking. Ethyl acetate was then added in an amount of 1% to each of the broths which had been heat-treated at 60° C. for 10 minutes and the untreated broths, and the resulting broths were incubated under the optimum conditions for extraction of the glucose isomerizing enzyme, i.e. at pH 6.5 to 7.0, for 24 hours. The results obtained were as shown in Table 5. As is clear from Table 5, a glucose isomerizing enzyme can be fixed in the cells of any strain of streptomyces by heat-treatment. That is, it can be said to be a knowledge which is applicable to all the glucose isomerzing enzymes produced in the cells of Streptomyces.

TABLE 5

| Strain used | Conditions for treatment | G.I. extracted (A) (unit/ml.) | Total G.I. (B) (unit/ml.) | Extraction ratio (A)/(B)×100 (percent) |
|---|---|---|---|---|
| *Streptomyces wedomorensis* | Untreated | 13.1 | 15.0 | 87 |
|  | 60° C., 10 min | 2.2 | 15.1 | 15 |
| *Streptomyces bobiliae* | Untreated | 5.2 | 8.1 | 64 |
|  | 60° C., 10 min | 1.2 | 8.0 | 15 |
| *Streptomyces galbus* | Untreated | 3.6 | 4.5 | 80 |
|  | 60° C., 10 min | 0.9 | 4.5 | 20 |
| *Streptomyces pseudogriseolus* | Untreated | 6.0 | 7.1 | 84 |
|  | 60° C., 10 min | 1.2 | 7.0 | 17 |
| *Streptomyces canus* | Untreated | 10.1 | 12.0 | 83 |
|  | 60° C., 10 min | 2.0 | 12.0 | 17 |
| *Streptomyces achromogenus* | Untreated | 5.7 | 6.5 | 82 |
|  | 60° C., 10 min | 1.0 | 6.7 | 15 |

NOTE.—G.I. = Glucose isomerizing enzyme.

EXAMPLE 5

This example illustrate the repeated use in a batchwise procedure of the glucose isomerizing enzyme fixed in the cells.

The broth obtained according to the procedure as described in Example 1 was heat-treated at 65° C. for 15 minutes and filtered to collect the cells (total glucose isomerizing enzyme; 1800 units). The cells thus obtained were then added to a mixture having the following composition, the total volume being 150 ml., and the reaction was carried out at 70° C. and at pH 6.0 to 7.5.

| | |
|---|---|
| Glucose _____ percent concentration | 50 |
| Phosphate buffer _____ M | 0.05 |
| $MgSO_4$ _____ M | 0.05 |
| $CoCl_2$ _____ M | 0.001 |

The reaction was discontinued when about 40% of the original glucose was converted to fructose, and the cells were recovered by centrifugal separation. The recovered cells were then added to a fresh mixture having the same composition, and the reaction was repeated in the same manner as above.

Thus, the heat-treated cells were repeatedly used seven times, and the results obtained were as shown in Table 6 below.

TABLE 6

| | Reaction time (hour) | Conversion ratio* |
|---|---|---|
| No. of use: | | |
| 1 | 24 | 48 |
| 2 | 24 | 42 |
| 3 | 24 | 37 |
| 4 | 26 | 40 |
| 5 | 32 | 41 |
| 6 | 37 | 39 |
| 7 | 39 | 29 |

$$*\text{Conversion ratio} = \frac{(\text{Fructose}) \times 100}{(\text{Glucose}) + (\text{fructose})} \text{ (percent)}$$

EXAMPLE 6

This example illustrates the use in the continuous glucose isomerization of the heat-treated cells packed in a column.

The broth obtained according to the procedure as described in Example 1 was heat-treated at 65° C. for 15 minutes and thereafter filtered to collect the cells (1850 units). The cells thus obtained were then packed in a glass column, 1.7 cm. x 10 cm., equipped with a column theremostat for circulating water (about 70° C.), and a mixture of 40% glucose, 0.05 M phosphate buffer, 0.05 M $MgSO_4$ and 0.001 M $CoCl_2$ (pH 8.0) was passed continuously through said glass column at a rate of about 4 ml. per hour. This procedure was continued for 15 days.

FIG. 1 indicates the amount of glucose (dry basis) passed through the column and the amount of fructose (dry basis) produced. As is clear from FIG. 1, a syrup having the average conversion ratio of 40% was obtained.

We claim:

1. A process of fixing glucose isomerizing enzyme in cells of a microorganism, comprising the steps of
   cultivating a microorganism from the Streptomyces genus which produces glucose isomerizing enzymes, to obtain an enzyme system having present cells of the microorganism which contain glucose isomerizing enzymes and enzymes which have the ability to cause autolysis of the cells,
   heat treating said enzyme system to substantially inactivate said enzymes having the ability to cause autolysis of the cells, said heat treatment being performed prior to enzymatic autolysis of the cells occurring at a temperature of about 60° C. to about 85° C.

2. A process of treating cells of a microorganism as defined in claim 1, wherein the microorganism cultivated is characterized as having the ability to produce heat stable glucose isomerizing enzymes.

3. A process for converting glucose into fructose comprising cultivating a microorganism from the Streptomyces genus which produces glucose isomerizing enzymes to obtain an enzyme system having present cells of the microorganism which contain glucose isomerizing enzymes and enzymes which have the ability to cause autolysis of the cells, heat treating said enzyme system prior to enzymatic autolysis of the cells occurring at a temperature of about 60° C. to about 85° C., and adding said heat treated cells in a glucose-containing solution under conditions whereby a portion of the glucose is converted to fructose.

4. The process, as set forth in claim 3, wherein said glucose-containing solution containing said heat treated cells, is maintained at a temperature between about 45° C. and about 80° C. and at a pH between about 5.5 and about 8.0.

5. The process as set forth in claim 3, further comprising continuously converting glucose into fructose by employing said cells containing said glucose isomerizing enzymes fixed therein.

6. The process, as set forth in claim 3, further comprising the step of recovering said cells containing said glucose isomerizing enzyme from the glucose-fructose solution, and adding said recovered cells repeatedly to other glucose containing solutions to convert a portion of the glucose to fructose.

7. A process for converting glucose into fructose as defined in claim 3, wherein the microorganism cultivated is characterized as having the ability to produce heat stable glucose isomerizing enzymes.

References Cited

Yoshimura et al., Agr. Biol. Chem., vol. 30, pp. 1015–23, 1966.

Takasaki, Y., "Prod. of Glucose Isomerase." Agr. Biol. Chem., Vol. 30, No. 12, pp. 1247–53, 1966.

A. LOUIS MONACELL, Primary Examiner

G. M. NATH, Assistant Examiner

U.S. Cl. X.R.

195—65